3,158,604
2,19-CYCLO-PREGNANE DERIVATIVES
Alexander D. Cross, Mexico City, Mexico, assignor to Syntex Corporation, Panama, Panama, a corporation of Panama
No Drawing. Filed Oct. 19, 1962, Ser. No. 231,828
20 Claims. (Cl. 260—239.55)

The present invention relates to novel cyclopentanophenanthrene derivatives and to a process for the production thereof.

More particularly the present invention relates to novel 2,19-cyclopregnane derivatives.

The novel compounds of the present invention are represented by the following formulae:

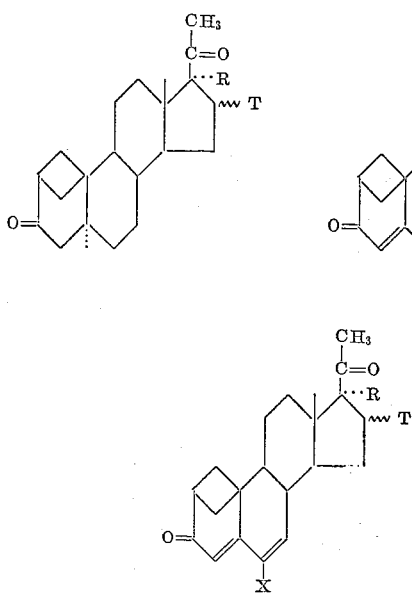

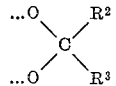

In the above formulae X represents hydrogen, fluorine or chlorine, all having α or β configurations, R represents hydrogen, a hydroxyl group or a hydrocarbon carboxylic acyloxy group of less than 12 carbon atoms; T represents hydrogen, α-hydroxy, α-acyloxy, α-methyl or β-methyl; and T and R together represent the group $$\begin{array}{c}...O\diagdown\phantom{R^2}\\\phantom{..}C\\...O\diagup\phantom{R^3}\end{array}\begin{array}{c}R^2\\\\R^3\end{array}$$

in the 16α,17α-positions, wherein $R^2$ and $R^3$ each represents hydrogen or a hydrocarbon residue of up to 8 carbon atoms of straight branched, cyclic or mixed aliphatic cyclic chain, or aromatic, such as methyl, ethyl, isopropyl, phenyl, methyl-cyclohexyl and the like.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering diuretic activities. When applied topically, these compounds are very useful in the treatment of acne.

The novel saturated compounds of the present invention are prepared by the process illustrated by the following equation:

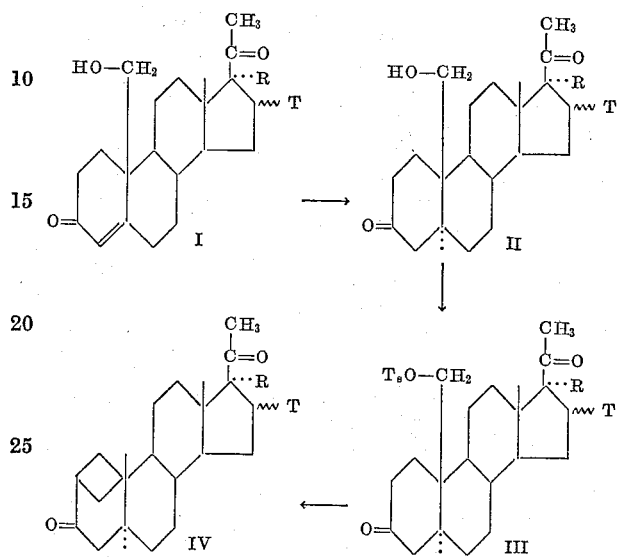

In the above formulae R and T have the same meaning as defined hereinbefore.

The starting compound (I) of the present process, which is a 19-hydroxy-$\Delta^4$-pregnene-3,20-dione derivative, is prepared from the corresponding 3β-acyloxy-$\Delta^5$-pregnene by treatment with hypobromous acid, reaction of the resulting 5α-bromo-6β-ol with lead tetraacetate, treatment of the resulting acylate of the corresponding 5α-bromo-6β,19-oxido-pregnan-3β-ol with zinc in ethanol, hydrolysis in a basic medium of the resulting 3-acylates of 3β,19-hydroxy-$\Delta^5$-pregnene to give the corresponding free 3β,19-dihydroxy-$\Delta^5$-pregnene which is finally treated with the Oppenauer method for a period of time of the order of 10 minutes thus affording the desired 19-hydroxy-$\Delta^4$-pregnene-3,20-dione derivative (I).

In practicing the above outlined process the starting compound (I) is conventionally hydrogenated in the presence of a suitable catalyst, such as 5% palladium-on-charcoal, to give the corresponding 19-hydroxyallopregnan-3-one derivatives (II). The latter 19-alcohol (II) is treated conventionally with tosyl-chloride in pyridine, at approximately 0° C. for a period of time of the order of 16 hours, to give the corresponding 19-tosylate (III) which upon treatment with an alkali metal hydride, such as sodium hydride, in an inert non-polar organic solvent, such as toluene, affords the corresponding 2,19-cycloallopregnan-3-one (IV).

The novel $\Delta^4$-pregnene derivatives of the present invention are prepared in accordance with the process exemplified as follows:

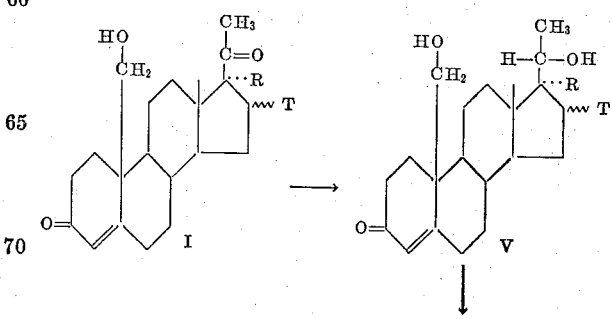

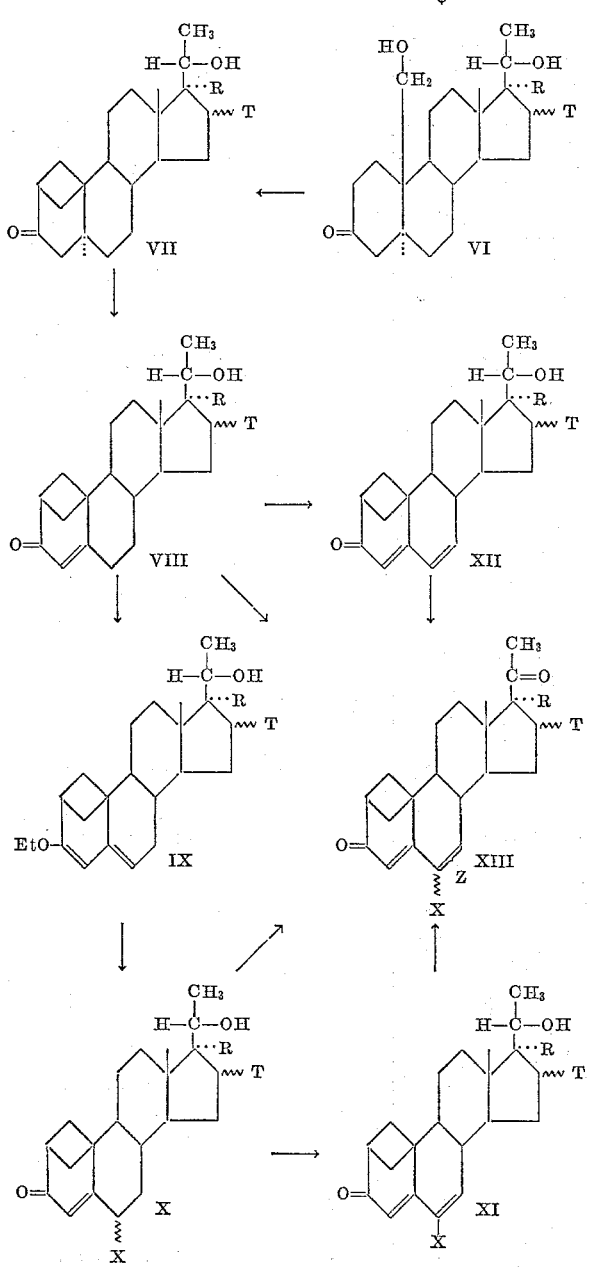

In the above formulae R, T and X have the same meanings as described hereinbefore, and Z represents a double bond or a saturated linkage between C-6 and C-7.

In practicing the process just outlined, the starting 19-hydroxy-Δ⁴-pregnene-3,20-dione derivative (I) is reduced with a double metal hydride, preferably lithium aluminum hydride, under conventional conditions to give the corresponding Δ⁴ - pregnene-3β,19,20β-triol compound, which upon selective oxidation of the allylic 3β-hydroxyl with approximately 1 molar equivalent of 2,3-dichloro-5,6-dicyano-1,4-benzoquinone, at room temperature, for a period of time of the order of 3 hours in an inert solvent, yields the corresponding Δ⁴-pregnene-19,20β-diol-3-one (V). The latter Δ⁴-pregnene derivative (V) is conventionally hydrogenated in the presence of the suitable catalyst such as platinum oxide, to give the corresponding allopregnane-19,20β-diol-3-one (VI) which upon conventional treatment with tosyl-chloride in pyridine at 0° C. yields the corresponding Δ⁴-pregnene-19,20β-diol-3-one ditosylate. The latter ditosylate upon treatment with an alkali metal hydride, such as sodium hydride, in a non- polar organic solvent, such as toluene, preferably at reflux temperature for a period of time of the order of 10 hours yields the corresponding 2,19-cyclo-allopregnan-20α-ol-3-one derivative (VII). The latter saturated 3-ketone, upon treatment with approximately one molar equivalent of bromine in the presence of hydrogen-bromide yields the corresponding 4α-bromo-derivative, which is thereafter dehydrobrominated in a basic medium, such as calcium carbonate in dimethylformamide, preferably at reflux temperature, for a period of time of the order of 30 minutes, to give the corresponding 2,19-cyclo-Δ⁴-pregnen-20α-ol-3-one derivative (VIII). The last named Δ⁴-3-ketone (VIII) is treated with ethylorthoformate in the presence of p-toluenesulfonic acid to give the corresponding 3-ethoxy-2,19-cyclo-Δ³,⁵-pregnadien-20α-ol compound (IX) which upon treatment with 1 molar equivalent of N-chlorosuccinimide in acetic acid-sodium acetate-acetone solution or with perchloryl fluoride in dimethylformamide, affords respectively the corresponding 6β-chloro- or 6β-fluoro - 2,19 - cyclo-Δ⁴-pregnen-20α-ol-3-one (X: X=β-halo). The 6β-halo group or the latter compounds is conventionally epimerized in an acid medium, such as acetic acid-hydrogen chloride, thus affording the corresponding 6α - halo-2,19-cyclo-Δ⁴-pregnen-20α-ol-3-one compounds (X: X=6α-halo).

The Δ⁴-pregnen-3-one derivatives of the present invention (VIII, X) upon treatment with ethyl orthoformate in the presence of p-toluenesulfonic acid, afford the corresponding 3-ethoxy-2,19-cyclo-Δ³,⁵-pregnadien-20α-ol derivatives, which upon treatment with approximately 1 molar equivalent of 2,3-dichloro-5,6-dicyano-1,4-benzoquinone in an inert solvent, such as tetrahydrofuran, in the presence of p-toluenesulfonic acid, preferably at 0° C. and for a period of time of the order of 30 minutes, yield the corresponding 2,19-cyclo-Δ⁴,⁶-pregnadien-20α-ol-3-one derivatives (XII and XI).

The 20α-hydroxyl group of the Δ⁴ and Δ⁴,⁶-3-keto-2,19-cyclo derivatives of the present invention (VIII, X, XI and XII) is conventionally oxidized, preferably with chromium trioxide in pyridine to the corresponding 2,19-cyclo-3,20-diketo derivatives (XIII).

The compounds of the present invention having a 16α,17α - ketonide grouping, yield the corresponding 16α,17α-diols by conventional treatment with an acid such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl-ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a hydroxyl group at C-17α, may be acylated by conventional treatment with an acylating agent, such as an anhydride derived from a hydrocarbon carboxylic acid of the type described hereinbefore, in the presence of p-toluenesulfonic acid, to produce the corresponding 17α-esters.

The following specific examples serve to illustrate the present invention, but are not intended to limit the scope thereof.

*Example I*

1 g. of Δ⁴-pregnen-19-ol-3,20-dione (obtained in accordance with Bowers U.S. Pat. Appl. Ser. No. 201,802 filed June 12, 1962) dissolved in 50 cc. of ethyl acetate was hydrogenated overnight in the presence of 0.3 g. of a 5% palladium-on-charcoal catalyst at atmospheric pressure and room temperature. Removal of catalyst and solvent and crystallization of the residue from acetone furnished allopregnan-19-ol-3,20-dione (Compound No. 1).

Following the same procedure, the compounds listed under I (obtained in accordance with the aforesaid patent application) were respectively converted into the products listed under II.

| I | II |
|---|---|
| | Cpd. No.: |
| 16α-methyl-Δ⁴-pregnen-19-ol-3,20-dione. | (2) 16α-methyl-allopregnan-19-ol-3,20-dione. |
| 16β-methyl-Δ⁴-pregnen-19-ol-3,20-dione. | (3) 16β-methyl-allopregnan-19-ol-3,20-dione. |
| 16α,17α-isopropylidenedioxy-Δ⁴-pregnen-19-ol-3,20-dione. | (4) 16α,17α-isopropylidenedioxy-allopregnan-19-ol-3,20-dione. |
| Δ⁴-pregnene-17α,19-diol-3,20-dione 17-acetate. | (5) Allopregnane-17α,19-diol-3,20-dione 17-acetate. |
| 16α-methyl-Δ⁴-pregnene-17α,19-diol-3,20-dione 17-acetate. | (6) 16α-methyl-allopregnane-17α,19-diol-3,20-dione 17-acetate. |

*Example II*

A solution of 5 g. of allopregnan-19-ol-3,20-dione (Cpd. No. 1) in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained allopregnan-19-ol-3,20-dione tosylate (Cpd. No. 1).

One gram of the latter tosylate was dissolved in 30 cc. of toluene and thereto was added 1 g. of sodium hydride suspended in mineral oil. The resulting mixture was refluxed for 5 hours. Then, 5 cc. of t-butanol were cautiously added to decompose the excess of hydride, and the whole was washed with water, dried and evaporated to dryness. Alumina chromatograph of the residue, followed by crystallization from acetone-hexane yielded 2,19-cycloallopregnane-3,20-dione (Cpd. No. 8).

Following the above described procedures, the compounds Nos. 2 to 6 inclusive, were firstly converted into the corresponding 19-tosylates and secondly respectively into:

Cpd. No.—
(9) 16α-methyl-2,19-cyclo-allopregnane-3,20-dione.
(10) 16β-methyl-2,19-cyclo-allopregnane-3,20-dione.
(11) 16α,17α-isopropylidenedioxy-2,19-cyclo-allopregnane-3,20-dione.
(12) 2,19-cyclo-allopregnan-17α-ol-3,20-dione.
(13) 16α-methyl-2,19-cyclo-allopregnan-17α-ol-3,20-dione.

*Example III*

A solution of 1 g. of Δ⁴-pregnen-19-ol-3,20-dione in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving Δ⁴-pregnene-3β,19,20β triol (Cpd. No. 14).

The rest of the starting compounds of Example I was treated by the same procedure, yielding respectively:

Cpd. No.—
(15) 16α-methyl-Δ⁴-pregnene-3β,19,20β-triol.
(16) 16β-methyl-Δ⁴-pregnene-3β,19,20β-triol.
(17) 16α,17α-isopropylidenedioxy-Δ⁴-pregnene-3β,19,20β-triol.
(18) Δ⁴-pregnene-3β,17α,19,20β-tetrol 17-acetate.
(19) 16α-methyl-Δ⁴-pregnene-3β,17α,19,20β-tetrol 17-acetate.

*Example IV*

A mixture of 1 g. of Δ⁴-pregnene-3β,19,20β-triol (Cpd. No. 14) in 20 cc. of dioxane, and 1.1 molar equivalents of 2,3-dichloro, 5,6-dicyano, 1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave Δ⁴-pregnene-19,20β-diol-3-one (Cpd. No. 20).

The compounds Nos. 15 to 19, inclusive, were treated by the above procedure, thus affording respectively:

Cpd. No.—
(21) 16α-methyl-Δ⁴-pregnene-19,20β-diol-3-one.
(22) 16β-methyl-Δ⁴-pregnene-19,20β-diol-3-one.
(23) 16α,17α-isopropylidenedioxy-Δ⁴-pregnene-17α,19,20β-triol-3-one.
(24) Δ⁴-pregnene-17α,19,20β-triol-3-one 17-acetate.
(25) 16α-methyl-Δ⁴-pregnene-17α,19,20β-triol-3-one 17-acetate.

*Example V*

A solution of 2.0 g. of Δ⁴-pregnene-19,20β-diol-3-one (Cpd. No. 20) in 100 cc. of ethyl acetate was shaken with 100 mg. of platinum oxide catalyst in a hydrogen atmosphere until the gas uptake corresponded to one mol. The catalyst was filtered off and the filtrate evaporated to dryness. Recrystallization from acetone-hexane afforded allopregnane-19,20β-diol-3-one (Cpd. No. 26).

The compounds Nos. 21 to 25, inclusive, were treated in accordance with the same technique; thus affording respectively:

Cpd. No.—
(27) 16α-methyl-allopregnane-19,20β-diol-3-one.
(28) 16β-methyl-allopregnane-19,20β-diol-3-one.
(29) 16α,17α-isopropylidenedioxy-allopregnane-19,20β-diol-3-one.
(30) Allopregnane-17α,19,20β-triol-3-one 17-acetate.
(31) 16α-methyl-allopregnane-17α,19,20β-triol-3-one 17-acetate.

*Example VI*

The compounds Nos. 26 to 31, inclusive, were treated in accordance with Example II, thus furnishing firstly the corresponding 19,20-ditosylates and then respectively:

Cpd. No.—
(32) 2,19-cyclo-allopregnan-20α-ol-3-one.
(33) 16α-methyl-2,19-cyclo-allopregnan-20α-ol-3-one.
(34) 16β-methyl-2,19-cyclo-allopregnan-20α-ol-3-one.
(35) 16α,17α-isopropylidenedioxy-2,19-cyclo-allopregnan-20α-ol-3-one.
(36) 2,19-cyclo-allopregnane-17α,20α-diol-3-one.
(37) 16α-methyl-2,19-cyclo-allopregnane-17α,20α-diol-3-one.

*Example VII*

A solution of 5 g. of 2,19-cyclo-allopregnan-20α-ol-3-one (Cpd. No. 32) in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded 4α-bromo-2,19-cyclo-allopregnan-20α-ol-3-one (Cpd. No. 38).

2 g. of compound No. 38 in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 2,19-cyclo-Δ⁴-pregnen-20α-ol-3-one (Cpd. No. 39).

Following the above procedures there were treated the compounds Nos. 33 to 37, inclusive, thus affording the corresponding 4α-bromo derivatives thereof and then respectively:

Cpd. No.—
(40) 16α-methyl-2,19-cyclo-Δ⁴-pregnen-20α-ol-3-one.
(41) 16β-methyl-2,19-cyclo-Δ⁴-pregnen-20α-ol-3-one.
(42) 16α,17α-isopropylidenedioxy-2,19-cyclo-Δ⁴-pregnen-20α-ol-3-one.
(43) 2,19-cyclo-Δ⁴-pregnene-17α,20α-diol-3-one.
(44) 16α-methyl-2,19-cyclo-Δ⁴-pregnene-17α,20α-diol-3-one.

*Example VIII*

A suspension of 1 g. of 2,19-cyclo-Δ⁴-pregnen-20α-ol-3-one (Cpd. No. 39) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded, 3-ethoxy-2,19-cyclo-Δ³,⁵-pregnadien-20α-ol (Cpd. No. 45).

The compounds Nos. 40 to 44, inclusive, were treated under exactly the same conditions, yielding respectively:

Cpd. No.—
(46) 3-ethoxy-16α-methyl-2,19-cyclo-Δ³,⁵-pregnadien-20α-ol.
(47) 3-ethoxy-16β-methyl-2,19-cyclo-Δ³,⁵-pregnadien-20α-ol.
(48) 3-ethoxy-16α,17α-isopropylidenedioxy-2,19-cyclo-Δ³,⁵-pregnadien-20α-ol.
(49) 3-ethoxy-2,19-cyclo-Δ³,⁵-pregnadiene-17α,20α-diol.
(50) 3-ethoxy-16α-methyl-2,19-cyclo-Δ³,⁵-prednadiene-17α,20α-diol.

*Example IX*

A mixture of 5 g. of 3-ethoxy-2,19-cyclo-Δ³,⁵-pregnadien-20α-ol (Cpd. No. 45), 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-2,19-cyclo-Δ⁴-pregnen-20α-ol-3-one (Cpd. No. 51).

Following the same procedure there were treated the compounds Nos. 46 to 50, inclusive, thus giving respectively:

Cpd. No.—
(52) 6β-chloro-16α-methyl-2,19-cyclo-Δ⁴-pregnen-20α-ol-3-one.
(53) 6β-chloro-16β-methyl-2,19-cyclo-Δ⁴-pregnen-20α-ol-3-one.
(54) 6β-chloro-16α,17α-isopropylidenedioxy-2,19-cyclo-Δ⁴-pregnen-20α-ol-3-one.
(55) 6β-chloro-2,19-cyclo-Δ⁴-pregnene-17α,20α-diol-3-one.
(56) 6β-chloro-16α-methyl-2,19-cyclo-Δ⁴-pregnene-17α,20α-diol-3-one.

*Example X*

1 g. of 3-ethoxy-2,19-Δ³,⁵-pregnadien-20α-ol-3-one (Cpd. No. 45) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β-fluoro-2,19-cyclo-Δ⁴-pregnen-20α-ol-3-one (Cpd. No. 57).

The compounds Nos. 46 to 50, inclusive, were treated by the same technique, thus giving respectively:

Cpd. No.—
(58) 6β-fluoro-16α-methyl-2,19-cyclo-Δ⁴-pregnen-20α-ol-3-one.
(59) 6β-fluoro-16β-methyl-2,19-cyclo-Δ⁴-pregnen-20α-ol-3-one.
(60) 6β-fluoro-16α,17α-isopropylidenedioxy-2,19-cyclo-Δ⁴-pregnen-20α-ol-3-one.
(61) 6β-fluoro-2,19-cyclo-Δ⁴-pregnene-17α,20α-diol-3-one.
(62) 6β-fluoro-16α-methyl-2,19-cyclo-Δ⁴-pregnene-17α,20α-diol-3-one.

*Example XI*

One gram of 6β-chloro-2,19-cyclo-Δ⁴-pregnen-20α-ol-3-one (Cpd. No. 51) was dissolved in 50 cc. of glacial acetic acid and a stream of dry hydrochloric acid passed for a period of 24 hours, while maintaining the temperature around 15° C. The mixture was poured into cold water, the precipitate formed was separated, washed with water, dried and crystallized from acetone-hexane to yield 6α-chloro-2,19-cyclo-Δ⁴-pregnen-20α-ol-3-one (Cpd. No. 63).

Following the same procedure there were treated the compounds Nos. 52 to 56, inclusive, thus giving respectively:

Cpd. No.—
(64) 6α-chloro-16α-methyl-2,19-cyclo-Δ⁴-pregnen-20α-ol-3-one.
(65) 6α-chloro-16β-methyl-2,19-cyclo-Δ⁴-pregnen-20α-ol-3-one.
(66) 6α-chloro-16α,17α-isopropylidenedioxy-2,19-cyclo-Δ⁴-pregnen-20α-ol-3-one.
(67) 6α-chloro-2,19-cyclo-Δ⁴-pregnene-17α,20α-diol-3-one.
(68) 6α-chloro-16α-methyl-2,19-cyclo-Δ⁴-pregnene-17α,20α-diol-3-one.

*Example XII*

The compound No. 57 was treated according to Example XI to produce 6α-fluoro-2,19-cyclo-Δ⁴-pregnen-20α-ol-3-one (Cpd. No. 69).

The compounds Nos. 58 to 62, inclusive, were treated by the same technique, thus giving respectively:

Cpd. No.—
(70) 6α-fluoro-16α-methyl-2,19-Δ⁴-pregnen-20α-ol-3-one.
(71) 6α-fluoro-16β-methyl-2,19-Δ⁴-pregnen-20α-ol-3-one.
(72) 6α-fluoro-16α,17α-isopropylidenedioxy-2,19-cyclo-Δ⁴-pregnen-20α-ol-3-one.
(73) 6α-fluoro-2,19-cyclo-Δ⁴-pregnene-17α,20α-diol-3-one.
(74) 6α-fluoro-16α-methyl-2,19-Δ⁴-pregnene-17α,20α-diol-3-one.

*Example XIII*

A suspension of 1 g. of 6β-chloro-2,19-cyclo-Δ⁴-pregnen-20α-ol-3-one (Cpd. No. 51) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine was added and then water. The formed precipitate was collected by filtration, water washed and air dried. Recrystallization from acetone-hexane afforded 3-ethoxy-6-chloro-2,19-cyclo-$\Delta^{3,5}$-pregnadien-20α-ol (Cpd. No. 75).

A solution of 1 g. of compound No. 75 in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated hydroquinone was filtered off and 100 cc. of methylene chloride were added to the filtrate.

The organic solution was washed with 5% aqueous sodium hydroxide solution until the washings were colorless, then with water to neutrality, dried over anhydrous sodium sulfate and evaporated to dryness. Crystallization from acetone-hexane gave 6-chloro-2,19-cyclo-$\Delta^{4,6}$-pregnadien-20α-ol-3-one (Cpd. No. 76).

The compounds Nos. 52 to 62, inclusive, were treated following the procedures just described, thus affording firstly the corresponding 3-ethoxy-$\Delta^{3,5}$-derivatives and secondly, respectively, the following compounds:

Cpd. No.—
- (77) 6-chloro-16α-methyl-2,19-cyclo-$\Delta^{4,6}$-pregnadien-20α-ol-3-one.
- (78) 6-chloro-16β-methyl-2,19-cyclo-$\Delta^{4,6}$-pregnadien-20α-ol-3-one.
- (79) 6-chloro-16α,17α-isopropylidenedioxy-2,19-cyclo-$\Delta^{4,6}$-pregnadien-20α-ol-3-one.
- (80) 6-chloro-2,19-cyclo-$\Delta^{4,6}$-pregnadiene-17α,20α-diol-3-one.
- (81) 6-chloro-16α-methyl-2,19-cyclo-$\Delta^{4,6}$-pregnadiene-17α,20α-diol-3-one.
- (82) 6-fluoro-2,19-cyclo-$\Delta^{4,6}$-pregnadien-20α-ol-3-one.
- (83) 6-fluoro-16α-methyl-2,19-cyclo-$\Delta^{4,6}$-pregnadien-20α-ol-3-one.
- (84) 6-fluoro-16β-methyl-2,19-cyclo-$\Delta^{4,6}$-pregnadien-20α-ol-3-one.
- (85) 6-fluoro-16α,17α-isopropylidenedioxy-2,19-cyclo-$\Delta^{4,6}$-pregnadien-20α-ol-3-one.
- (86) 6-fluoro-2,19-cyclo-$\Delta^{4,6}$-pregnadiene-17α,20α-diol-3-one.
- (87) 6-fluoro-16α-methyl-2,19-cyclo-$\Delta^{4,6}$-pregnadiene-17α,20α-diol-3-one.

*Example XIV*

The compounds Nos. 45 to 50, were treated with 2,3-dichloro-5,6-dicyano, 1,4-benzoquinone in accordance with Example XIII, thus yielding respectively:

Cpd. No.—
- (88) 2,19-cyclo-$\Delta^{4,6}$-pregnadien-20α-ol-3-one.
- (89) 16α-methyl-2,19-cyclo-$\Delta^{4,6}$-pregnadien-20α-ol-3-one.
- (90) 16β-methyl-2,19-cyclo-$\Delta^{4,6}$-pregnadien-20α-ol-3-one.
- (91) 16α,17α-isopropylidenedioxy-2,19-cyclo-$\Delta^{4,6}$-pregnadien-20α-ol-3-one.
- (92) 2,19-cyclo-$\Delta^{4,6}$-pregnadiene-17α,20α-diol-3-one.
- (93) 16α-methyl-2,19-cyclo-$\Delta^{4,6}$-pregnadiene-17α,20α-diol-3-one.

*Example XV*

A solution of 6 g. of 2,19-cyclo-$\Delta^4$-pregnen-20α-ol-3-one (Cpd. No. 39) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 2,19-cyclo-$\Delta^4$-pregnene-3,20-dione (Cpd. No. 94).

Following the same procedure there were treated the compounds Nos. 40 to 44, inclusive, giving respectively:

Cpd. No.—
- (95) 16α-methyl-2,19-cyclo-$\Delta^4$-pregnene-3,20-dione,
- (96) 16β-methyl-2,19-cyclo-$\Delta^4$-pregnene-3,20-dione,
- (97) 16α,17α-isopropylidenedioxy-2,19-cyclo-$\Delta^4$-pregnene-3,20-dione,
- (98) 2,19-cyclo-$\Delta^4$-pregnen-17α-ol-3,20-dione,
- (99) 16α-methyl-2,19-cyclo-$\Delta^4$-pregnen-17α-ol-3,20-dione.

*Example XVI*

The compounds Nos. 51 to 74, inclusive were treated following the procedure described in Example XV, thus giving respectively:

Cpd. No.—
- (100) 6β-chloro-2,19-cyclo-$\Delta^4$-pregnene-3,20-dione,
- (101) 6β-chloro-16α-methyl-2,19-cyclo-$\Delta^4$-pregnene-3,20-dione,
- (102) 6β-chloro-16β-methyl-2,19-cyclo-$\Delta^4$-pregnene-3,20-dione,
- (103) 6β-chloro-16α,17α-isopropylidenedioxy-2,19-cyclo-$\Delta^4$-pregnene-3,20-dione,
- (104) 6β-chloro-2,19-cyclo-$\Delta^4$-pregnen-17α-ol-3,20-dione,
- (105) 6β-chloro-16α-methyl-2,19-cyclo-$\Delta^4$-pregnen-17α-ol-3,20-dione,
- (106) 6β-fluoro-2,19-cyclo-$\Delta^4$-pregnene-3,20-dione,
- (107) 6β-fluoro-16α-methyl-2,19-cyclo-$\Delta^4$-pregnene-3,20-dione,
- (108) 6β-fluoro-16β-methyl-2,19-cyclo-$\Delta^4$-pregnene-3,20-dione,
- (109) 6β-fluoro-16α,17α-isopropylidenedioxy-2,19-cyclo-$\Delta^4$-pregnene-3,20-dione,
- (110) 6β-fluoro-2,19-cyclo-$\Delta^4$-pregnene-17α-ol-3,20-dione,
- (111) 6β-fluoro-16α-methyl-2,19-cyclo-$\Delta^4$-pregnen-17α-ol-3,20-dione,
- (112) 6α-chloro-2,19-cyclo-$\Delta^4$-pregnene-3,20-dione,
- (113) 6α-chloro-16α-methyl-2,19-cyclo-$\Delta^4$-pregnene-3,20-dione,
- (114) 6α-chloro-16β-methyl-2,19-cyclo-$\Delta^4$-pregnene-3,20-dione,
- (115) 6α-chloro-16α,17α-isopropylidenedioxy-2,19-cyclo-$\Delta^4$-pregnene-3,20-dione,
- (116) 6α-chloro-2,19-cyclo-$\Delta^4$-pregnen-17α-ol-3,20-dione,
- (117) 6α-chloro-16α-methyl-2,19-cyclo-$\Delta^4$-pregnen-17α-ol-3,20-dione,
- (118) 6α-fluoro-2,19-cyclo-$\Delta^4$-pregnene-3,20-dione,
- (119) 6α-fluoro-16α-methyl-2,19-cyclo-$\Delta^4$-pregnene-3,20-dione,
- (120) 6α-fluoro-16β-methyl-2,19-cyclo-$\Delta^4$-pregnene-3,20-dione,
- (121) 6α-fluoro-16α,17α-isopropylidenedioxy-2,19-cyclo-$\Delta^4$-pregnene-3,20-dione,
- (122) 6α-fluoro-2,19-cyclo-$\Delta^4$-pregnen-17α-ol-3,20-dione,
- (123) 6α-fluoro-16α-methyl-2,19-cyclo-$\Delta^4$-pregnen-17α-ol-3,20-dione,

*Example XVII*

The compounds Nos. 76 to 93, inclusive, were treated in accordance with Example XV thus yielding respectively:

Cpd. No.—
- (124) 6-chloro-2,19-cyclo-$\Delta^{4,6}$-pregnadiene-3,20-dione,
- (125) 6-chloro-16α-methyl-2,19-cyclo-$\Delta^{4,6}$-pregnadiene-3,20-dione,
- (126) 6-chloro-16β-methyl-2,19-cyclo-$\Delta^{4,6}$-pregnadiene-3,20-dione,
- (127) 6-chloro-16α,17α-isopropylidenedioxy-2,19-cyclo-$\Delta^{4,6}$-pregnadiene-3,20-dione,
- (128) 6-chloro-2,19-cyclo-$\Delta^{4,6}$-pregnadien-17α-ol-3,20-dione,
- (129) 6-chloro-16α-methyl-2,19-cyclo-$\Delta^{4,6}$-pregnadien-17α-ol-3,20-dione, (130) 6-fluoro-2,19-cyclo-Δ⁴,⁶-pregnadiene-3,20-dione,
(131) 6-fluoro-16α-methyl-2,19-cyclo-Δ⁴,⁶-pregnadiene-3,20-dione,
(132) 6-fluoro-16β-methyl-2,19-cyclo-Δ⁴,⁶-pregnadiene-3,20-dione,
(133) 6-fluoro-16α,17α-isopropylidenedioxy-2,19-cyclo-Δ⁴,⁶-pregnadiene-3,20-dione,
(134) 6-fluoro-2,19-cyclo-Δ⁴,⁶-pregnadien-17α-ol-3,20-dione,
(135) 6-fluoro-16α-methyl-2,19-cyclo-Δ⁴,⁶-pregnadien-17α-ol-3,20-dione,
(136) 2,19-cyclo-Δ⁴,⁶-pregnadiene-3,20-dione,
(137) 16α-methyl-2,19-cyclo-Δ⁴,⁶-pregnadiene-3,20-dione,
(138) 16β-methyl-2,19-cyclo-Δ⁴,⁶-pregnadiene-3,20-dione,
(139) 16α,17α-isopropylidenedioxy-2,19-cyclo-Δ⁴,⁶-pregnadiene-3,20-dione,
(140) 2,19-cyclo-Δ⁴,⁶-pregnadien-17α-ol-3,20-dione,
(141) 16α-methyl-2,19-cyclo-Δ⁴,⁶-pregnadiene-17α-ol-3,20-dione.

*Example XVIII*

To a solution of 5 g. of 2,19-cyclo-allopregnan-17α-ol-3,20-dione (Cpd. No. 12) in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 2,19-cyclo-allopregnan-17α-ol-3,20-dione acetate (Cpd. No. 142).

The compounds Nos. 13, 98, 99, 104, 105, 110, 111, 116, 117, 122, 123, 128, 129, 134, 135, 140 and 141 were treated in accordance with the foregoing procedure, thus affording respectively:

Cpd. No.—
(143) 16α-methyl-2,19-cyclo-allopregnan-17α-ol-3,20-dione acetate.
(144) 2,19-cyclo-Δ⁴-pregnen-17α-ol-3,20-dione acetate.
(145) 16α-methyl-2,19-cyclo-Δ⁴-pregnen-17α-ol-3,20-dione acetate.
(146) 6β-chloro-2,19-cyclo-Δ⁴-pregnen-17α-ol-3,20-dione acetate.
(147) 6β-chloro-16α-methyl-2,19-cyclo-Δ⁴-pregnen-17α-ol-3,20-dione acetate.
(148) 6β-fluoro-2,19-cyclo-Δ⁴-pregnen-17α-ol-3,20-dione acetate.
(149) 6β-fluoro-16α-methyl-2,19-cyclo-Δ⁴-pregnen-17α-ol-3,20-dione acetate.
(150) 6α-chloro-2,19-cyclo-Δ⁴-pregnen-17α-ol-3,20-dione acetate.
(151) 6α-chloro-16α-methyl-2,19-cyclo-Δ⁴-pregnen-17α-ol-3,20-dione acetate.
(152) 6α-fluoro-2,19-cyclo-Δ⁴-pregnen-17α-ol-3,20-dione acetate.
(153) 6α-fluoro-16α-methyl-2,19-cyclo-Δ⁴-pregnen-17α-ol-3,20-dione acetate.
(154) 6-chloro-2,19-cyclo-Δ⁴,⁶-pregnadien-17α-ol-3,20-dione acetate.
(155) 6-chloro-16α-methyl-2,19-cyclo-Δ⁴,⁶-pregnadien-17α-ol-3,20-dione acetate.
(156) 6-fluoro-2,19-cyclo-Δ⁴,⁶-pregnadien-17α-ol-3,20-dione acetate.
(157) 6-fluoro-16α-methyl-2,19-cyclo-Δ⁴,⁶-pregnadien-17α-ol-3,20-dione acetate.
(158) 2,19-cyclo-Δ⁴,⁶-pregnadien-17α-ol-3,20-dione acetate.
(159) 16α-methyl-2,19-cyclo-Δ⁴,⁶-pregnadien-17α-ol-3,20-dione acetate.

*Example XIX*

The starting compounds of the preceding example were treated in accordance with that example, except that acetic anhydride was substituted by caproic anhydride, propionic anhydride and cyclopentyl propionic anhydride, thus affording respectively the corresponding caproates, propionates and cyclopentyl propionates of said starting compounds.

*Example XX*

1 g. of 16α,17α-isopropylidenedioxy-2,19-cyclo-allopregnane-3,20-dione (Cpd. No. 11) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 2,19-cyclo-allopregnane-16α,17α-diol-3,20-dione (Cpd. No 160).

Following the same procedure there were treated the compounds Nos. 115, 121, 127, 133 and 139, thus giving respectively:

Cpd. No.—
(161) 6α-chloro-2,19-cyclo-Δ⁴-pregnene-16α,17α-diol-3,20-dione,
(162) 6α-fluoro-2,19-cyclo-Δ⁴-pregnene-16α,17α-diol-3,20-dione,
(163) 6-chloro-2,19-cyclo-Δ⁴,⁶-pregnadiene-16α,17α-diol-3,20-dione,
(164) 6-fluoro-2,19-cyclo-Δ⁴,⁶-pregnadiene-16α,17α-diol-3,20-dione,
(165) 2,19-cyclo-Δ⁴,⁶-pregnadiene-16α,17α-diol-3,20-dione.

*Example XXI*

A mixture of 1 g. of 2,19-cyclo-allopregnane-16α,17α-diol-3,20-dione (Cpd. No. 160), 4 cc. of pyridine and 2 cc. of propionic anhydride was kept at room temperature overnight, poured into ice water, the formed precipitate was filtered, washed with water and dried. Crystallization from acetone-hexane gave 2,19-cyclo-allopregnane-16α,17α-diol-3,20-dione 16-propionate (Cpd. No. 166).

The compounds Nos. 161 to 165, inclusive, were treated in accordance with the latter method to give respectively:

Cpd. No.—
(167) 6α-chloro-2,19-cyclo-Δ⁴-pregnene-16α,17α-diol-3,20-dione 16-propionate,
(168) 6α-fluoro-2,19-cyclo-Δ⁴-pregnene-16α,17α-diol-3,20-dione 16-propionate,
(169) 6-chloro-2,19-cyclo-Δ⁴,⁶-pregnadiene-16α,17α-diol-3,20-dione 16-propionate,
(170) 6-fluoro-2,19-cyclo-Δ⁴,⁶-pregnadiene-16α,17α-diol-3,20-dione 16-propionate,
(171) 2,19-cyclo-Δ⁴,⁶-pregnadiene-16α,17α-diol-3,20-dione 16-propionate.

*Example XXII*

The compounds Nos. 166 and 167 were treated according to Example XVIII, thus giving respectively: 2,19-cyclo-allopregnane-16α,17α-diol-3,20-dione 16-propionate-17-acetate (Cpd. No. 172) and 6α-chloro-2,19-cyclo-Δ⁴-pregnene-16α,17α-diol-3,20-dione 16-propionate 17-acetate (Cpd. No. 173).

I claim:
1. A compound of the following formula:

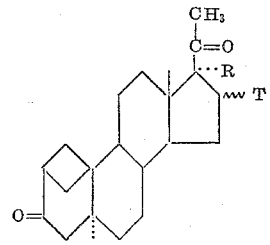

wherein R is selected from the group consisting of hydrogen, hydroxyl and a hydrocarbon carboxylic acyloxy group of less than 12 carbon atoms; T is a member of the group consisting of hydrogen, α-hydroxyl, α-hydrocarbon carboxylic acyloxy group of less than 12 carbon atoms; α-methyl and β-methyl; and T and R together form the group

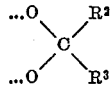

in the 16α,17α-positions wherein $R^2$ and $R^3$ are selected from the group consisting of hydrogen and a hydrocarbon residue of up to 8 carbon atoms.

2. 2,19-cycloallopregnane-3,20-dione.
3. 16α-methyl-2,19-cyclo-allopregnane-3,20-dione.
4. 16β-methyl-2,19-cyclo-allopregnane-3,20-dione.
5. 16α,17α-isopropylidenedioxy - 2,19 - cyclo-allopregnane-3,20-dione.
6. 2,19-cyclo-allopregnan-17α-ol-3,20-dione.
7. 16α - methyl - 2,19 - cyclo-allopregnan-17α-ol-3,20-dione.
8. A compound of the following formula:

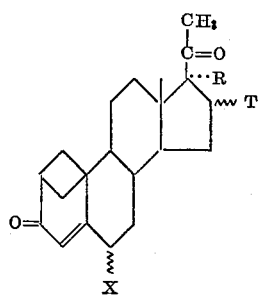

wherein X is selected from the group consisting of hydrogen, α-fluorine, β-fluorine, α-chlorine and β-chlorine; R is selected from the group consisting of hydrogen, hydroxyl and a hydrocarbon carboxylic acyloxy group of less than 12 carbon atoms; T is a member of the group consisting of hydrogen, α-hydroxyl, α-hydrocarbon carboxylic acyloxy group of less than 12 carbon atoms, α-methyl and β-methyl; and T and R together form the group

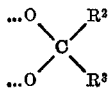

in the 16α,17α-positions wherein $R^2$ and $R^3$ are selected from the group consisting of hydrogen and a hydrocarbon residue of up to 8 carbon atoms.

9. 2,19-cyclo-$\Delta^4$-pregnene-3,20-dione.
10. 16α-methyl-2,19-cyclo-$\Delta^4$-pregnene-3,20-dione.
11. 16β-methyl-2,19-cyclo-$\Delta^4$-pregnene-3,20-dione.
12. 16α,17α-isopropylidenedioxy - 2,19 - cyclo-$\Delta^4$-pregnene-3,20-dione.
13. 2,19-cyclo-$\Delta^4$-pregnen-17α-ol-3,20-dione.
14. 16α - methyl - 2,19 - cyclo-$\Delta^4$-pregnen-17α-ol-3,20-dione.
15. 6α-chloro-2,19-cyclo-$\Delta^4$-pregnen-17α-ol-3,20-dione.
16. 6α-chloro-16α-methyl - 2,19 - cyclo-$\Delta^4$-pregnen-17α-ol-3,20-dione.
17. 6α-fluoro-16α-methyl - 2,19 - cyclo-$\Delta^4$-pregnen-17α-ol-3,20-dione.
18. 6α-fluoro-2,19-cyclo-$\Delta^4$-pregnen-17α-ol-3,20-dione.
19. 6α-fluoro-16α,17α-isopropylidenedioxy - 2,19-cyclo-$\Delta^4$-pregnene-3,20-dione.
20. A compound of the following formula:

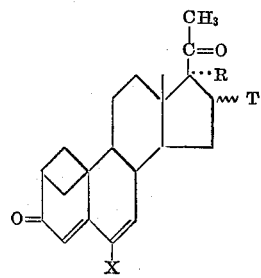

wherein X is selected from the group hydrogen, fluorine and chlorine; R is selected from the group consisting of hydrogen, hydroxyl and a hydrocarbon carboxylic acyloxy group of less than 12 carbon atoms; T is a member of the group consisting of hydrogen, α-hydroxyl, α-hydrocarbon carboxylic acyloxy group of less than 12 carbon atoms; α-methyl and β-methyl; and T and R together form the group

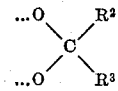

in the 16α,17α-positions wherein $R^2$ and $R^3$ are selected from the group consisting of hydrogen and a hydrocarbon residue of up to 8 carbon atoms.

No references cited.